(12) United States Patent
Ha et al.

(10) Patent No.: US 10,855,472 B2
(45) Date of Patent: Dec. 1, 2020

(54) ELECTRONIC DEVICE AND OPERATION METHOD THEREOF

(71) Applicant: Samsung Electronics Co., Ltd., Suwon-si (KR)

(72) Inventors: Seung-Hyun Ha, Seoul (KR); Dong-Uk Kim, Suwon-si (KR); Jin-Mok Kim, Yongin-si (KR); Ho-Sun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 337 days.

(21) Appl. No.: 15/869,960

(22) Filed: Jan. 12, 2018

(65) Prior Publication Data

US 2018/0205551 A1    Jul. 19, 2018

(30) Foreign Application Priority Data

Jan. 17, 2017    (KR) .................. 10-2017-0008060

(51) Int. Cl.
| | |
|---|---|
| H04L 29/06 | (2006.01) |
| H04L 9/32 | (2006.01) |
| H04W 12/12 | (2009.01) |
| H04W 12/02 | (2009.01) |
| H04W 12/00 | (2009.01) |
| H04W 12/10 | (2009.01) |
| H04W 4/70 | (2018.01) |

(52) U.S. Cl.
CPC .......... *H04L 9/3239* (2013.01); *H04L 9/3236* (2013.01); *H04L 63/0428* (2013.01); *H04L 63/08* (2013.01); *H04W 12/001* (2019.01); *H04W 12/02* (2013.01); *H04W 12/1002* (2019.01); *H04W 12/1008* (2019.01); *H04W 12/12* (2013.01); *H04L 63/123* (2013.01); *H04L 2209/72* (2013.01); *H04W 4/70* (2018.02)

(58) Field of Classification Search
CPC . H04W 12/06; H04L 63/0435; H04L 63/0876
See application file for complete search history.

(56) References Cited

U.S. PATENT DOCUMENTS

| | | | | |
|---|---|---|---|---|
| 8,316,237 | B1* | 11/2012 | Felsher ................ | H04L 9/0825 713/171 |
| 9,191,204 | B2* | 11/2015 | Seleznev ............. | H04N 7/1675 |
| 9,450,757 | B2* | 9/2016 | Modarresi ............ | H04L 9/3242 |
| 10,129,499 | B1* | 11/2018 | Boone ............... | H04W 12/0609 |
| 10,419,930 | B2* | 9/2019 | Holland ............ | H04W 12/0401 |
| 2015/0222621 | A1* | 8/2015 | Baum .................... | H04W 4/70 726/9 |
| 2015/0326398 | A1* | 11/2015 | Modarresi .............. | H04L 63/08 713/181 |
| 2017/0085688 | A1* | 3/2017 | Zhou .................. | H04M 1/0268 |
| 2017/0171181 | A1* | 6/2017 | Britt ....................... | H04L 63/08 |

(Continued)

*Primary Examiner* — Shin-Hon (Eric) Chen
*Assistant Examiner* — Viral S Lakhia
(74) *Attorney, Agent, or Firm* — Jefferson IP Law, LLP

(57) ABSTRACT

An electronic device that prevents damage and an operation method thereof are provided. The electronic device includes a transceiver, a memory configured to store a first part of a first program, and a processor configured to receive, using the transceiver, a second part of the first program from a second electronic device and perform a first function of the first program by using the first part and the second part.

8 Claims, 11 Drawing Sheets

(56) References Cited

U.S. PATENT DOCUMENTS

2017/0347264 A1* 11/2017 Holland ................ H04W 12/06
2018/0109395 A1* 4/2018 Berdy ..................... H04L 63/08
2018/0270064 A1* 9/2018 Gehrmann ............. H04W 4/70

* cited by examiner

# US 10,855,472 B2

1

ELECTRONIC DEVICE AND OPERATION METHOD THEREOF

CROSS-REFERENCE TO RELATED APPLICATION(S)

This application claims the benefit under 35 U.S.C. § 119(a) of a Korean patent application filed on Jan. 17, 2017 in the Korean Intellectual Property Office and assigned Serial number 10-2017-0008060, the entire disclosure of which is hereby incorporated by reference.

TECHNICAL FIELD

The present disclosure relates to an electronic device that prevents damage, such as hacking, data leakage, etc., and an operation method thereof.

BACKGROUND

With the recent development of communication technology, technologies related to Internet of things (IoT) have spread widely. Accordingly, issues related to information security for IoT devices have also been highlighted.

Conventional security technologies for electronic devices use hardware-based security solutions, such as a trusted execution environment (TEE), a secure element (SE), or the like. However, in an IoT environment where IoT devices are lightweight, it is not easy to apply hardware-based security solutions because only limited resources should be used. In other words, since the hardware performance of IoT devices is limited, it is not easy to apply the existing security solutions, and there is thus more concern about hacking or data leakage with IoT devices compared to general electronic devices.

Further, there is a technology for protecting data for IoT devices using IoT hubs, but there is no technology for protecting the IoT devices themselves.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device and an operation method thereof, wherein a second part of a program, which is received from an external electronic device, is applied to a first part of the program, which is stored in a memory and is for performing a specific function, so as to perform the specific function.

In accordance with an aspect of the present disclosure, an electronic device is provided. The electronic device includes a transceiver, a memory configured to store a first part of a first program, and a processor configured to control the transceiver to receive a second part of the first program from a second electronic device, and perform a first function of the first program by using the first part and the second part.

In accordance with another aspect of the present disclosure, a method of the electronic device is provided. The operation method includes requesting a first function of the first electronic device, receiving a second part of a first program for performing the first function from a second electronic device, and performing the first function by using a first part of the first program and the second part.

In accordance with another aspect of the present disclosure, an electronic device is provided. The electronic device includes a transceiver, a memory configured to store a first part of a first program, a processor configured to control the transceiver to transmit the first part to a second electronic device, wherein the second device is configured to perform a first function of the first program by using the first part and a second part of the first program that is stored in the second electronic device.

In accordance with another aspect of the present disclosure, an electronic device has an effect of distributing and storing data necessary for a program that performs a specific function, by storing a first part of the program, which is for performing the specific function, in a memory and storing the remaining second part of the program in an external electronic device. Therefore, the electronic device according to an embodiment of the present disclosure can prevent damage, such as hacking, data leakage, etc.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
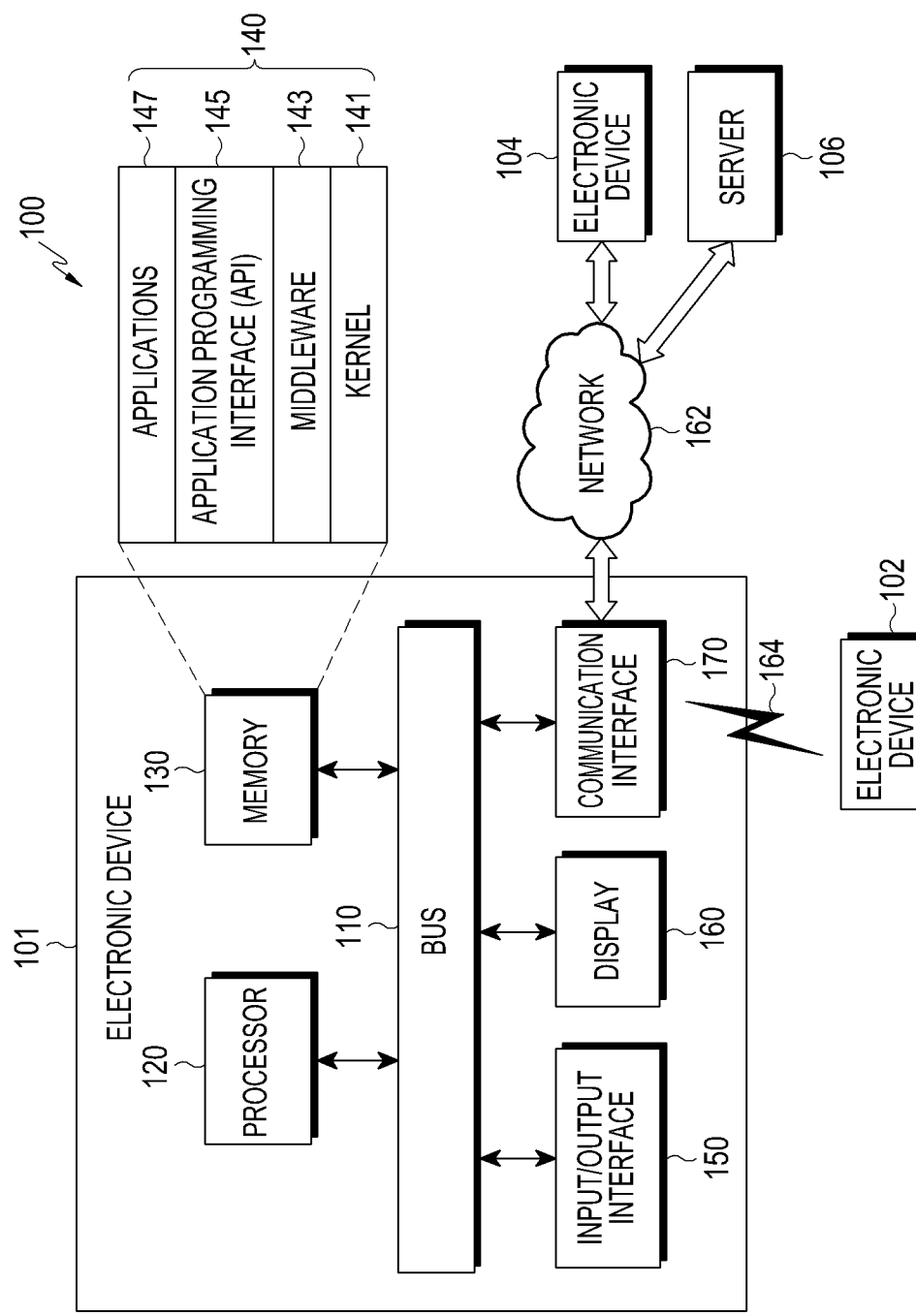
FIG. 1 is a block diagram for an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The expression "configured to" as used in various embodiments of the present disclosure may be interchangeably used with, for example, "suitable for", "having the capacity to", "designed to", "adapted to", "made to", or "capable of" in terms of hardware or software, according to the circumstances. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

An electronic device according to various embodiments of the present disclosure may include at least one of, for example, a smart phone, a tablet personal computer (PC), a mobile phone, a video phone, an electronic book reader, a desktop PC, a laptop PC, a netbook computer, a workstation, a server, a personal digital assistant (PDA), a portable multimedia player (PMP), a MPEG-1 audio layer-3 (MP3) player, a medical device, a camera, and a wearable device. The wearable device may include at least one of an accessory type (e.g., a watch, a ring, a bracelet, an anklet, a necklace, glasses, a contact lens, or a head-mounted device (HMD)), a fabric or clothing integrated type (e.g., a piece of electronic clothing), a body-mounted type (e.g., a skin pad, or tattoo), and a bio-implantable type. In some embodiments, the electronic device may include at least one of, for example, a television, a digital video disc (DVD) player, an audio, a refrigerator, an air conditioner, a vacuum cleaner, an oven, a microwave oven, a washing machine, an air purifier, a set-top box, a home automation control panel, a security control panel, a media box (e.g., Samsung HomeSync™, Apple TV™, or Google TV™), a game console (e.g., Xbox™ and PlayStation™), an electronic dictionary, an electronic key, a camcorder, and an electronic photo frame.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a Vehicle Infotainment Device, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or Internet device of Things (e.g., a light bulb, various sensors, a sprinkler device, a fire alarm, a thermostat, a streetlamp, a toaster, a sporting goods, a hot water tank, a heater, a boiler, etc.). According to some embodiments, the electronic device may include at least one of a part of furniture, a building/structure, or a vehicle, an electronic board, an electronic signature receiving device, a projector, and various kinds of measuring instruments (e.g., a water meter, an electric meter, a gas meter, and a radio wave meter). In various embodiments, the electronic device may be flexible, or may be a combination of one or more of the aforementioned various devices. The electronic device according to an embodiment of the present disclosure is not limited to the above described devices. In the present disclosure, the term "user" may indicate a person using an electronic device or a device (e.g., an artificial intelligence electronic device) using an electronic device.

FIG. 1 is a block diagram for an electronic device according to an embodiment of the present disclosure.

Referring to FIG. 1, an electronic device 101 in a network environment 100 according to various embodiments will be described. The electronic device 101 may include a bus 110, a processor 120, a memory 130, an input/output interface 150, a display 160, and a communication interface 170. In some embodiments, the electronic device 101 may omit at least one of the above elements or may further include other elements. The bus 110 may include a circuit that connects elements 110-170 to each other and transfers communication (e.g., a control message or data) between the elements. The processor 120 may include one or more of a central processing unit, an AP, or a communication processor (CP). The processor 120, for example, may carry out operations or data processing relating to the control and/or communication of at least one other element of the electronic device 101.

The memory 130 may include a volatile and/or nonvolatile memory. The memory 130 may store, for example, instructions or data relevant to at least one other element of the electronic device 101. According to an embodiment, the memory 130 may store software and/or a program 140. The program 140 may include, for example, a kernel 141, middleware 143, an application programming interface (API) 145, and/or applications 147. At least some of the kernel 141, the middleware 143, and the API 145 may be referred to as an operating system. The kernel 141 may control or manage system resources (for example, the bus 110, the processor 120, or the memory 130) used for executing an operation or function implemented by other programs (for example, the middleware 143, the API 145, or the applications 147). Furthermore, the kernel 141 may provide an interface through which the middleware 143, the API 145, or the application 147 may access the individual elements of the electronic device 101 to control or manage the system resources.

The middleware 143 may function as, for example, an intermediary for allowing the API 145 or the applications 147 to communicate with the kernel 141 to exchange data. Furthermore, the middleware 143 may process one or more task requests, which are received from the applications 147, according to priorities thereof. For example, the middleware 143 may assign priorities for using the system resources (for example, the bus 110, the processor 120, the memory 130, or the like) of the electronic device 101 to one or more of the applications 147, and may process the one or more task requests. The API 145 is an interface through which the applications 147 control functions provided from the kernel 141 or the middleware 143, and may include, for example, at least one interface or function (for example, instruction) for file control, window control, image processing, or text control. For example, the input/output interface 150 may forward instructions or data, input from a user or an external device, to the other element(s) of the electronic device 101, or may output instructions or data, received from the other element(s) of the electronic device 101, to the user or the external device.

The display 160 may include, for example, a liquid crystal display (LCD), a light emitting diode (LED) display, an organic LED (OLED) display, a micro electro mechanical system (MEMS) display, or an electronic paper display. The display 160 may display, for example, various types of content (e.g., text, images, videos, icons, and/or symbols) for a user. The display 160 may include a touch screen and may receive, for example, a touch input, a gesture input, a proximity input, or a hovering input using an electronic pen or a part of the user's body. The communication interface 170, for example, may set communication between the electronic device 101 and an external device (e.g., a first external electronic device 102, a second external electronic device 104, or a server 106). For example, the communication interface 170 may be connected to a network 162 through wireless or wired communication to communicate with the external device (for example, the second external electronic device 104 or the server 106), or may connect to an external device (e.g., the first external electronic device 102) using a wireless direct connection 164.

The wireless communication may include, for example, cellular communication including at least one among long-term evolution (LTE), LTE Advance (LTE-A), code division multiple access (CDMA), wideband CDMA (WCDMA), universal mobile telecommunications system (UMTS), wireless broadband (WiBro), global system for mobile communications (GSM), and the like. According to an embodiment, the wireless communication may include, for example, at least one among wireless fidelity (Wi-Fi), Bluetooth (BT), Bluetooth low energy (BLE), ZigBee, near field communication (NFC), magnetic secure transmission, radio frequency (RF), and body area network (BAN). According to an embodiment, the wireless communication may include a global navigation satellite system (GNSS). The GNSS may be, for example, a GPS, a Global Navigation Satellite System (Glonass), a Beidou Navigation Satellite System (hereinafter, referred to as "Beidou"), or Galileo (the European global satellite-based navigation system). Hereinafter, in this document, the term "GPS" may be interchangeable with the term "GNSS". The wired communication may include, for example, at least one among a universal serial bus (USB), a high definition multimedia interface (HDMI), recommended standard 232 (RS-232), power line communication, a plain old telephone service (POTS), etc. The network 162 may include at least one of telecommunication networks, for example, a computer network (e.g., local area network (LAN) or wide area network (WAN)), the Internet, or a telephone network.

Each of the first and second external electronic devices 102 and 104 may be of a type identical to or different from that of the electronic device 101. According to various embodiments, all or some of the operations performed by the electronic device 101 may be performed by another electronic device, a plurality of electronic devices (for example, the electronic devices 102 and 104), or the server 106. According to an embodiment, when the electronic device 101 has to perform a function or service automatically or in response to a request, the electronic device 101 may request another device (for example, the electronic device 102 or 104, or the server 106) to perform at least some functions relating thereto, instead of autonomously or additionally performing the function or service. Other electronic devices (e.g., electronic devices 102 and 104) may execute the requested functions or the additional functions, and may transfer a result of the execution to the electronic device 101. The electronic device 101 may provide the received result as it is or additionally process the received result and provide the requested functions or services. To achieve this, for example, cloud computing, distributed computing, or client-server computing technology may be used.

Figure 2:
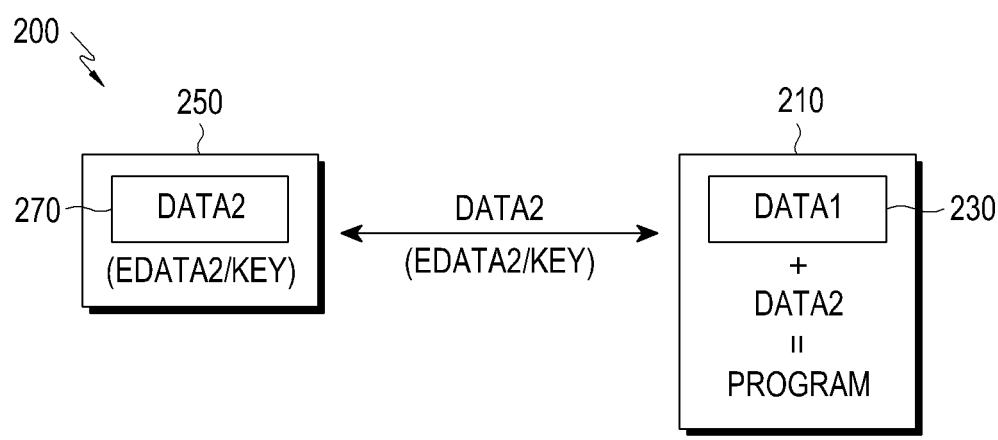
FIG. 2 is a block diagram of an electronic system according to an embodiment of the present disclosure.

FIG. 2 is a block diagram of an electronic system according to an embodiment of the present disclosure.

Referring to FIG. 2, an electronic system 200 may include a first electronic device 210 and a second electronic device 250.

The electronic system 200 may be implemented substantially the same as or similar to the network environment 100 described in FIG. 1. For example, the first electronic device 210 in the electronic system 200 may be connected to the second electronic device 250 via a wireless communication technology or a wired communication technology.

According to an embodiment, the first electronic device 210 may perform a first function by using a program PROGRAM. For example, the first electronic device 210 may be implemented as an Internet of things (IoT) device. For example, the first function may be a particular function (e.g., a boot function of the first electronic device 210, a function related to personal information, a function related to confidential information, and a function set by a user, etc.) provided by the first electronic device 210.

The first electronic device 210 may store first data DATA1 in a memory 230. For example, the memory 230 may be implemented as a nonvolatile memory.

The first data DATA1 may refer to data on a first part for generating the program PROGRAM. Further, the first data DATA1 may be stored in the first electronic device 210, and may be implemented as firmware, binary, source codes, software, applications and/or the like, which may perform a preset function of the first electronic device 210. The preset function may refer to a basic communication function and/or an authentication function of the first electronic device 210.

The first electronic device 210 may request the second electronic device 250 to transmit second data DATA2 in order to perform the first function.

The second electronic device 250 may store the second data DATA2 in a memory 270. For example, the second electronic device 250 may be implemented as an IoT hub and/or a terminal (e.g., a smartphone). Further, the memory 270 may be implemented as a nonvolatile memory.

Further, the second electronic device 250 may transmit the second data DATA2 to the first electronic device 210 in response to a request made by the first electronic device 210.

The second data DATA2 may refer to data on a second part for generating the program PROGRAM. Further, the second data DATA2 may be stored in the second electronic device 250, and may refer to data that may be combined (or updated) with the first data to generate the program PROGRAM capable of performing the first function. For example, the second data DATA2 may be implemented as firmware, binary, source codes, software, and/or some or all of applications.

The first electronic device 210 may generate the program PROGRAM by using the first data DATA1 for the first part and the second data DATA2 for the second part.

The first electronic device 210 may execute the program PROGRAM to perform the first function corresponding to the program PROGRAM.

According to an embodiment, the second electronic device 250 may store encrypted second data EDATA2 in the memory 270.

Further, the second electronic device 250 may transmit the encrypted second data EDATA2 to the first electronic device 210 in response to the request made by the first electronic device 210.

The encrypted second data EDATA2 may refer to data obtained by encrypting data (e.g., the second data DATA2) on the second part for generation of the program PROGRAM.

The second electronic device 250 may transmit a key KEY for decrypting the encrypted second data EDATA2 to the first electronic device 210.

The first electronic device 210 may decrypt the encrypted second data EDATA2 by using the key KEY. Further, the first electronic device 210 may acquire the second data DATA2 by decrypting the encrypted second data EDATA2.

The first electronic device 210 may generate the program PROGRAM by using the first data DATA1 for the first part and the second data DATA2 for the second part.

The first electronic device 210 may execute the program PROGRAM to perform the first function corresponding to the program PROGRAM.

According to an embodiment, the second electronic device 250 may store the second data DATA2 in the memory 270.

The second electronic device 250 may encrypt the second data DATA2 and transmit the encrypted second data EDATA2 to the first electronic device 210, in response to a request made by the first electronic device 210.

The second electronic device 250 may transmit the key KEY for decrypting the encrypted second data EDATA2 to the first electronic device 210.

The first electronic device 210 may decrypt the encrypted second data EDATA2 by using the key KEY. Further, the first electronic device 210 may acquire the second data DATA2 by decrypting the encrypted second data EDATA2.

The first electronic device 210 may generate the program PROGRAM by using the first data DATA1 for the first part and the second data DATA2 for the second part.

The first electronic device 210 may execute the program PROGRAM to perform the first function corresponding to the program PROGRAM.

Figure 3:
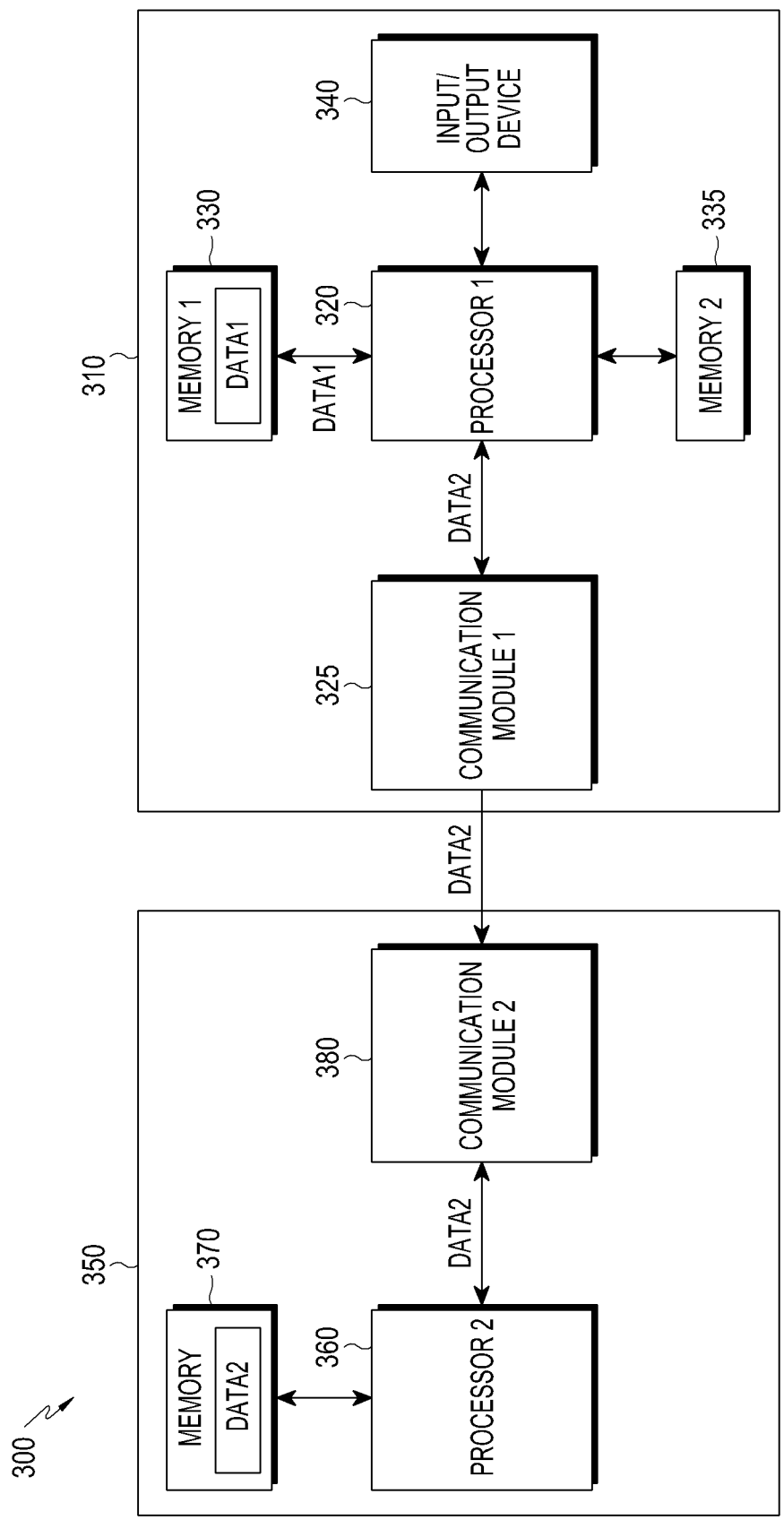
FIG. 3 is a block diagram of an electronic system according to an embodiment of the present disclosure.

FIG. 3 is a block diagram of an electronic system according to an embodiment of the present disclosure.

Referring to FIG. 3, an electronic system 300 may include a first electronic device 310 and a second electronic device 350.

The electronic system 300 may be implemented substantially the same as or similar to the electronic system 200 described in FIG. 2.

The first electronic device 310 may include a first processor 320, a first communication module 325, a first memory 330, a second memory 335, and an input/output device 340.

The first processor 320 may control an overall operation of the first electronic device 310.

According to an embodiment, the first processor 320 may initiate to perform a first function. For example, the first processor 320 may be requested to perform the first function through the input/output device 340.

The first processor 320 may request, from the second electronic device 350, second data DATA2 for a second part of a first program PR for performing the first function, through the first communication module 325.

For example, the first processor 320 may request, from the second electronic device 350, the second data DATA2 of the second part for performing the first function, by using first data DATA1 of a first part.

The first processor 320 may receive, from the second electronic device 350, the second data DATA2 for the second part of the first program PR through the first communication module 325.

The first processor 320 may also receive authentication information for the second data DATA2 through the first communication module 325. For example, the first processor 320 may confirm the authentication information for the second data DATA2. For example, the authentication information may refer to information for confirming that the second data DATA2 received from the second electronic device 350 is data transmitted from the second electronic device 350. The authentication information may be included in the second data DATA2. For example, the authentication information may include information related to an identification (ID) and/or Internet protocol (IP) address which indicates the second electronic device 350.

The first processor 320 may generate the first program PR by using the first data DATA1 for the first part and the second data DATA2 for the second part, according to a result of the confirmation of the authentication information. For example, the first processor 320 may generate the first program PR by updating the second data DATA2 for the second part to the first data DATA1 of the first part. Further, the first processor 320 may store the first program PR in the second memory 335 in order to execute the generated first program PR.

The first processor 320 may perform the first function by executing the first program PR.

For example, the first program PR may be implemented substantially the same as or similar to the program PROGRAM described in FIG. 2. The first program PR may be implemented as an application, source codes, firmware, and the like which may perform the first function.

The first processor 320 may perform the first function, and may delete the second data DATA2 for the second part when the performance is completed. In addition, the first processor 320 may also delete the first program PR.

The first communication module 325 may perform a function for communication with the second electronic device 350. For example, the first communication module 325 may transmit data to or receive data from the second electronic device 350 by using a wireless communication technology.

The first memory 330 may store the first part of the first program PR. For example, the first memory 330 may store the first data DATA1 for the first part for generating the first program PR. For example, the first memory 330 may be implemented as a nonvolatile memory.

The second memory 335 may store the second data DATA2 received from the second electronic device 350. Further, the second memory 335 may store the first program PR generated by the first processor 320. For example, the second memory 335 may be implemented as a volatile memory.

The input/output device 340 may transmit an input signal to the first processor 320 in response to an input received from a user. For example, the input/output device 340 may be implemented as a touchscreen.

The second electronic device 350 may include a second processor 360, a memory 370, and a second communication module 380.

The second processor 360 may control an overall operation of the second electronic device 350.

According to an embodiment, the second processor 360 may receive a request (or a transmission request) relating to the second data DATA2 for the second part from the first electronic device 310 through the second communication module 380.

The second processor 360 may transmit the second data DATA2 for the second part to the first electronic device 310 in response to the request made from the first electronic device 310.

The memory 370 may store the second part of the first program PR. For example, the memory 370 may store the second data DATA2 for the second part for generating the first program PR. For example, the memory 370 may be implemented as a nonvolatile memory.

The second communication module 380 may perform a function for communication with the first electronic device 310. For example, the second communication module 380 may transmit data to or receive data from the first electronic device 310 by using a wireless communication technology.

Figure 4:
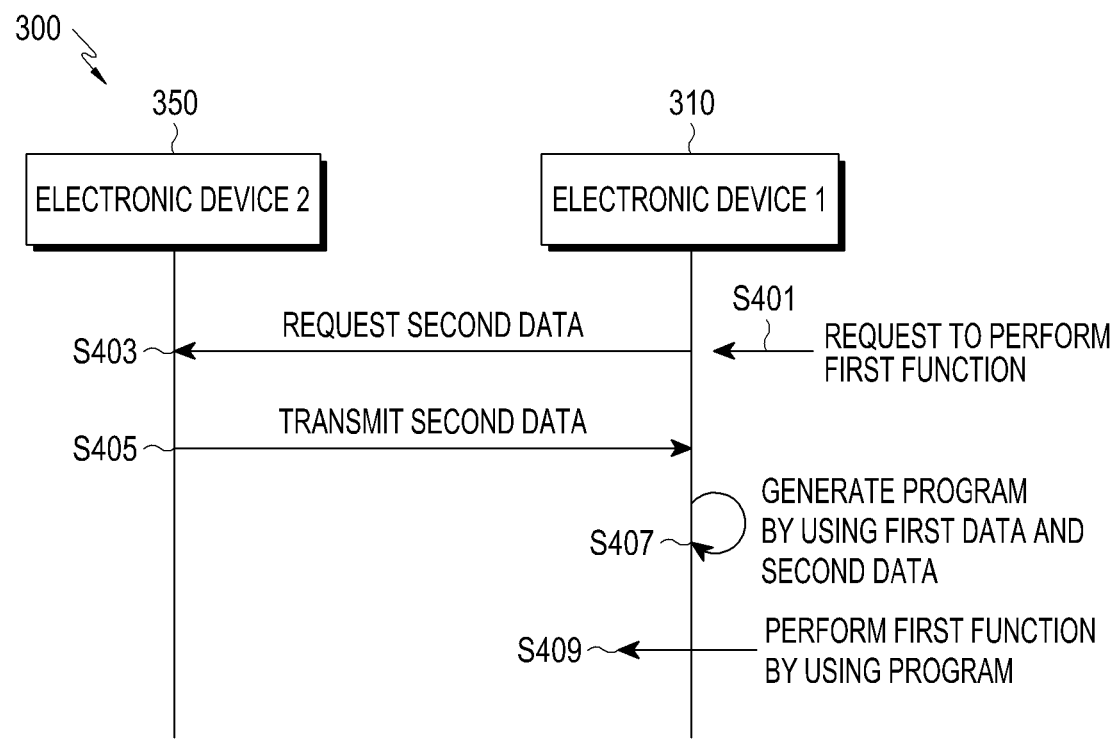
FIG. 4 is a data flow for explaining an operation of an electronic system according to an embodiment of the present disclosure.

FIG. 4 is a data flow for explaining an operation of an electronic system according to an embodiment of the present disclosure.

Referring to FIG. 4, an electronic system 400 may be implemented substantially the same as or similar to the electronic system 300 described in FIG. 3.

According to an embodiment, the first electronic device 310 may receive a request to perform the first function at operation S401. For example, the first electronic device 310 may receive a request to perform the first function, through the input/output device 340.

The first electronic device 310 may request, from the second electronic device 350, the second data DATA2 for the second part of the first program PR for performing the first function, through the first communication module 325 at operation S403.

For example, the first electronic device 310 may request, from the second electronic device 350, the second data DATA2 of the second part for performing the first function, by using the first data DATA1 for the first part.

The second electronic device 350 may transmit the second data DATA2 for the second part to the first electronic device 310 in response to the request made by the first electronic device 310 at operation S405.

The first electronic device 310 may receive the second data DATA2 for the second part of the first program PR from the second electronic device 350 through the first communication module 325.

The first electronic device 310 may generate the first program PR by using the first data DATA1 for the first part and the second data DATA2 for the second part at operation S407.

The first electronic device 310 may execute the first program PR to perform the first function at operation S409.

Meanwhile, the first processor 320 may perform the first function, and may delete the second data DATA2 for the second part when the performance is completed. Further, the first processor 320 may also delete the first program PR.

Figure 5:
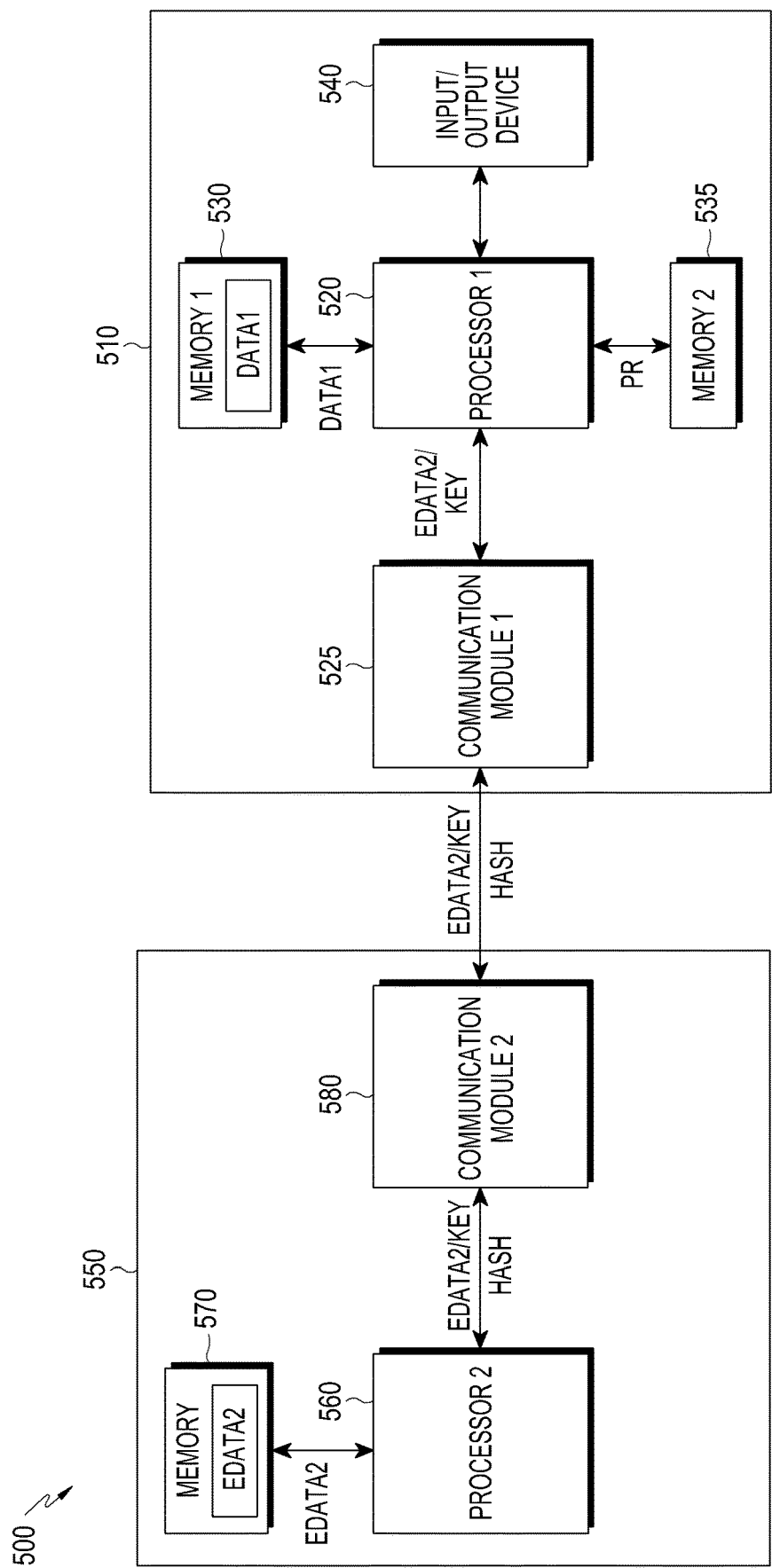
FIG. 5 is a block diagram of an electronic system according to an embodiment of the present disclosure.

FIG. 5 is a block diagram of an electronic system according to an embodiment of the present disclosure.

Referring to FIG. 5, an electronic system 500 may include a first electronic device 510 and a second electronic device 550. The electronic system 500 may be implemented substantially the same as or similar to the electronic system 200 described in FIG. 2.

The first electronic device 510 may include a first processor 520, a first communication module 525, a first memory 530, a second memory 535, and an input/output device 540.

The first processor 520 may control an overall operation of the first electronic device 510.

According to an embodiment, the first processor 520 may initiate to perform a first function. For example, the first processor 520 may receive a request to perform the first function through the input/output device 540.

The first processor 520 may request, from the second electronic device 550, second data DATA2 for a second part of a first program PR for performing the first function, through the first communication module 525.

For example, the first processor 520 may request, from the second electronic device 550, an encrypted second data EDATA2 of the second part for performing the first function by using first data DATA1 for a first part.

The first processor 520 may receive the encrypted second data EDATA2 for the second part of the first program PR from the second electronic device 550 through the first communication module 525. For example, the first processor 520 may also receive authentication information for the encrypted second data EDATA2. For example, the authentication information may be included in the encrypted second data EDATA2.

The first processor 520 may confirm the authentication information for the encrypted second data EDATA2. For example, the authentication information may refer to information for confirming that the encrypted second data EDATA2 received from the second electronic device 550 is data transmitted from the second electronic device 550. For example, the authentication information may include information related to an ID and/or IP address which indicate the second electronic device 550.

The first processor 520 may generate a hash value for the encrypted second data EDATA2, according to a result of the confirmation of the authentication information. For example, the first processor 520 may generate the hash value HASH by using the first data DATA1 and the encrypted second data EDATA2.

For example, the hash value HASH may refer to information that enables determination on whether the first data DATA1 and/or the encrypted second data EDATA2 have been altered. For example, the hash value HASH may be generated using a hash function.

The first processor 520 may transmit the hash value HASH to the second electronic device 550.

The first processor 520 may receive a key KEY for decrypting the encrypted second data EDATA2, from the second electronic device 550.

The first processor 520 may decrypt the encrypted second data EDATA2 by using the key KEY. For example, the decrypted second data DATA2 may be the second data DATA2 for the second part of the first program PR.

The first processor 520 may generate the first program PR by using the decrypted second data DATA2 and the first data DATA1 for the first part of the first program PR, which is stored in the first memory 530. For example, the first processor 520 may generate the first program PR by updating the second data DATA2 for the second part to the first data DATA1 for the first part. Further, the first processor 520 may store the first program PR in the second memory 535 in order to execute the generated first program PR.

The first processor 520 may execute the first program PR to perform the first function.

The first processor 520 may perform the first function, and may delete the decrypted second data DATA2 for the second part when the performance is completed. Further, the first processor 320 may also delete the first program PR.

The first communication module 525 may perform a function for communication with the second electronic device 550. For example, the first communication module 525 may transmit data to or receive data from the second electronic device 550 by using a wireless communication technology.

The first memory 530 may store the first part of the first program PR. For example, the first memory 530 may store the first data DATA1 for the first part for generating the first program PR. For example, the first memory 530 may be implemented as a nonvolatile memory.

The second memory 535 may store the second data DATA2 received from the second electronic device 550. Further, the second memory 535 may store the first program PR generated by the first processor 520. For example, the second memory 535 may be implemented as a volatile memory.

The input/output device 540 may transmit an input signal to the first processor 520 in response to an input received from the user. For example, the input/output device 540 may be implemented as a touchscreen.

The second electronic device 550 may include a second processor 560, a memory 570, and a second communication module 580.

The second processor 560 may control an overall operation of the second electronic device 550.

According to an embodiment, the second processor 560 may receive a request (or a transmission request) relating to the encrypted second data EDATA2 for the second part from the first electronic device 510 through the second communication module 580.

The second processor 560 may transmit the encrypted second data EDATA2 for the second part, which is stored in the memory 570, to the first electronic device 510 in response to the request made by the first electronic device 510.

The second processor 560 may receive a hash value HASH from the first electronic device 510.

The second processor 560 may determine the integrity of the hash value HASH. For example, the second processor 560 may compare the encrypted second data EDATA2 or the second data DATA2 with the hash value HASH, and may determine whether the hash value HASH has integrity according a result of the comparison.

The second processor 560 may transmit the key KEY for decrypting the encrypted second data EDATA2 to the first electronic device 510 according to a result of the determination.

For example, when the hash value HASH has integrity, the second processor 560 may transmit the key KEY for decrypting the encrypted second data EDATA2 to the first electronic device 510.

When the hash value HASH does not have integrity, the second processor 560 may determine that the first electronic device 510 has been hacked or the encrypted second data EDATA2 transmitted to the first electronic device 510 has been altered. At the time, the second processor 560 may not transmit the key KEY to the first electronic device 510. Further, when the hash value HASH does not have integrity, the second processor 560 may transmit notification information for stopping of the operation of the first electronic device 510 to the first electronic device 510.

The memory 570 may store the second part of the first program PR. For example, the memory 570 may store the encrypted second data EDATA2 for the second part for generating the first program PR. Further, the memory 570 may store the second data DATA2 for the second part for generating the first program PR. At this time, the second processor 560 may, when there is a request made by the first electronic device 510, encrypt the second data DATA2, and transmit the encrypted second data EDATA2 to the first electronic device 510.

The memory 570 may store the key KEY for decrypting the encrypted second data EDATA2. For example, the memory 570 may be implemented as a nonvolatile memory.

The second communication module 580 may perform a function for communication with the first electronic device 510. For example, the second communication module 580 may transmit data to or receive data from the first electronic device 510 by using a wireless communication technology.

Figure 6A:
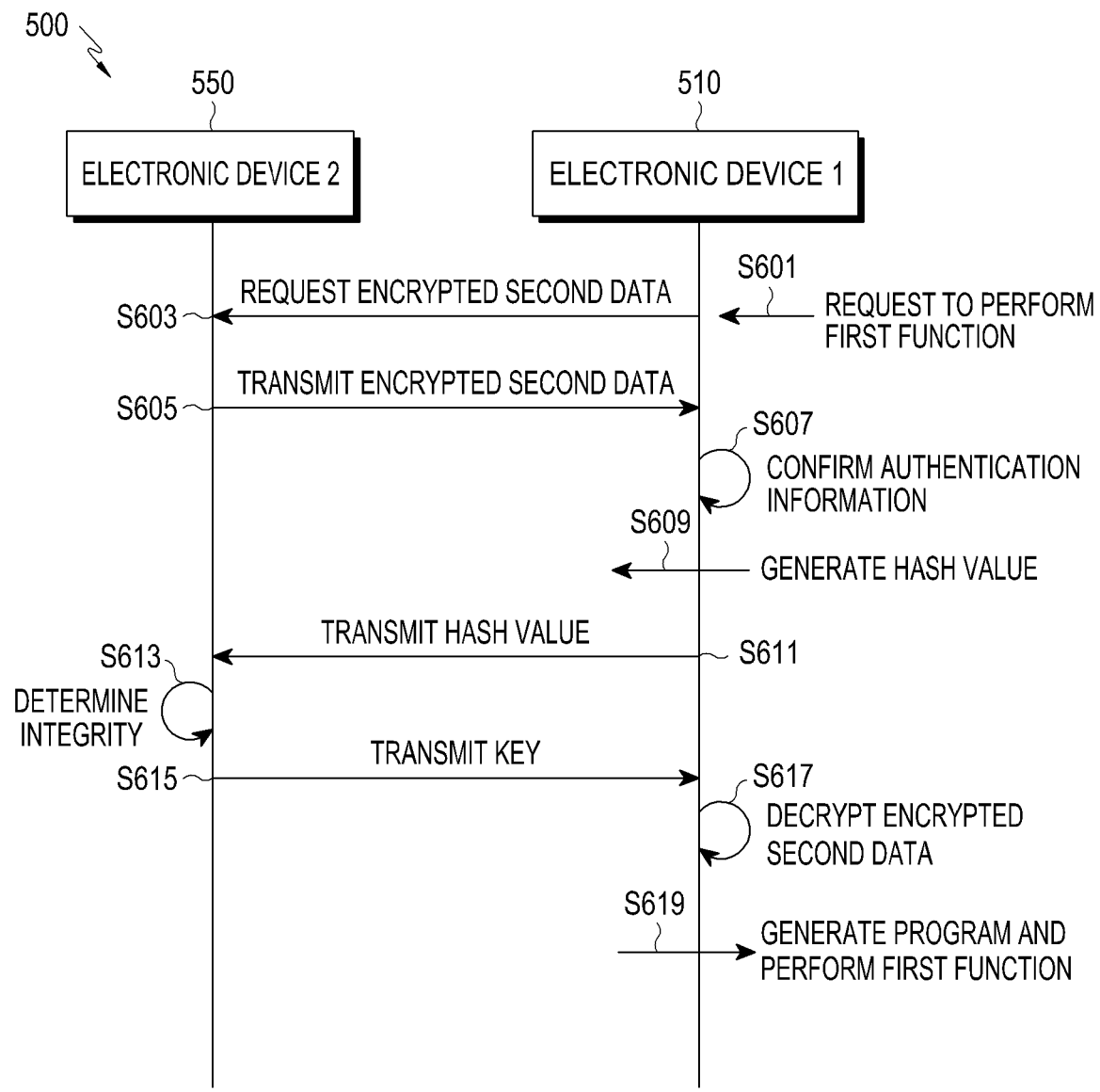
FIGS. 6A and 6B are data flows for explaining operations of an electronic system according to various embodiments of the present disclosure.
Figure 6B:
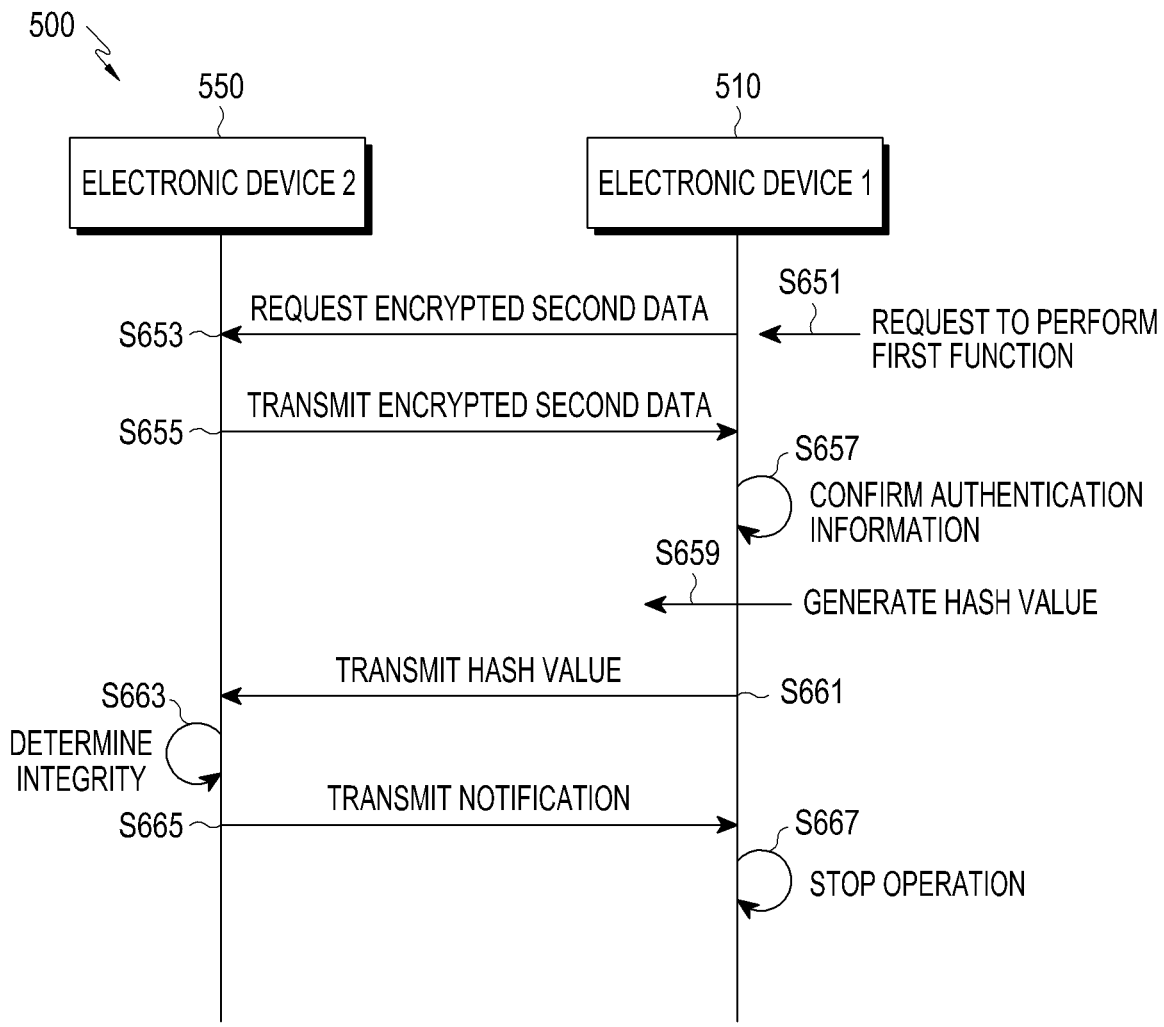

FIGS. 6A and 6B are data flows for explaining operations of an electronic system according to various embodiments of the present disclosure.

Referring to FIG. 6A, the first electronic device 510 may receive a request to perform the first function at operation S601. For example, the first electronic device 510 may receive a request to perform the first function, through the input/output device 540.

The first electronic device 510 may request, from the second electronic device 550, the encrypted second data EDATA2 or the second data DATA2 for the second part of the first program PR for performing the first function, through the first communication module 525 at operation S603.

For example, the first electronic device 510 may request, from the second electronic device 550, the encrypted second data EDATA2 of the second part for performing the first function, by using the first data DATA1 for the first part.

The second electronic device 550 may transmit the encrypted second data EDATA2 for the second part to the first electronic device 510 in response to the request made by the first electronic device 510. For example, the second electronic device 550 may transmit the encrypted second data EDATA2 stored in the memory 570 to the first electronic device 510. Further, the second electronic device 550 may encrypt the second data DATA2 stored in the memory 570 and transmit the encrypted second data EDATA2 to the first electronic device 510 at operation S605.

The first electronic device 510 may receive the encrypted second data EDATA2 for the second part of the first program PR from the second electronic device 550 through the first communication module 525. For example, the first electronic device 510 may also receive authentication information for the encrypted second data EDATA2.

The first electronic device 510 may confirm the authentication information for the encrypted second data EDATA2 at operation S607.

The first electronic device 510 may generate a hash value HASH for the encrypted second data EDATA2 according to a result of the confirmation at operation S609. For example, the first electronic device 510 may generate the hash value HASH by using the first data DATA1 and the encrypted second data EDATA2.

The first electronic device 510 may transmit the hash value HASH to the second electronic device 550 at operation S611.

The second electronic device 550 may receive the hash value from the first electronic device 510.

The second electronic device 550 may determine the integrity of the hash value HASH at operation S613. For example, the second electronic device 550 may compare the encrypted second data EDATA2 with the hash value HASH, and may determine whether the hash value HASH has integrity according to a result of the comparison.

The second processor 560 may transmit the key KEY for decrypting the encrypted second data EDATA2 to the first electronic device 510 according to a result of the determination at operation S615.

For example, when the hash value HASH has integrity, the second processor 560 may transmit the key KEY for decrypting the encrypted second data EDATA2 to the first electronic device 510.

The first electronic device 510 may receive the key KEY for decrypting the encrypted second data EDATA2 from the second electronic device 550.

The first electronic device 510 may decrypt the encrypted second data EDATA2 by using the key KEY at operation S617.

The first electronic device 510 may generate the first program PR by using the decrypted second data DATA2 and the first data DATA1 for the first part of the first program PR, which is stored in the first memory 530 at operation S619.

Further, the first electronic device 510 may execute the first program PR to perform the first function at operation S619.

Meanwhile, the first processor 520 may delete, after performing the first function, the decrypted second data DATA2 for the second part and the first program PR.

Referring to FIG. 6B, the first electronic device 510 may receive a request to perform the first function at operation S651. For example, the first electronic device 510 may receive a request to perform the first function, through the input/output device 540.

The first electronic device 510 may request, from the second electronic device 550, the encrypted second data EDATA2 or the second data DATA2 for the second part of the first program PR for performing the first function, through the first communication module 525 at operation S653.

For example, the first electronic device 510 may request, from the second electronic device 550, the encrypted second data EDATA2 of the second part for performing the first function, by using the first data DATA1 for the first part.

The second electronic device 550 may transmit the encrypted second data EDATA2 for the second part to the first electronic device 510 in response to the request made by the first electronic device 510 at operation S655. For example, the second electronic device 550 may transmit the encrypted second data EDATA2 stored in the memory 570 to the first electronic device 510. Further, the second electronic device 550 may encrypt the second data DATA2 stored in the memory 570 and transmit the encrypted second data EDATA2 to the first electronic device 510.

The first electronic device 510 may receive the encrypted second data EDATA2 for the second part of the first program PR from the second electronic device 550 through the first communication module 525. For example, the first electronic device 510 may also receive authentication information for the encrypted second data EDATA2.

The first electronic device 510 may confirm the authentication information for the encrypted second data EDATA2 at operation S657.

The first electronic device 510 may generate a hash value HASH for the encrypted second data EDATA2 according to a result of the confirmation at operation S659. For example, the first electronic device 510 may generate the hash value HASH by using the first data DATA1 and the encrypted second data EDATA2.

The first electronic device 510 may transmit the hash value HASH to the second electronic device 550 at operation S661.

The second electronic device 550 may receive the hash value HASH from the first electronic device 510.

The second electronic device 550 may determine the integrity of the hash value at operation S663. For example, the second electronic device 550 may compare the encrypted second data EDATA2 with the hash value HASH and determine whether the hash value HASH has integrity according to a result of the comparison.

When the hash value HASH does not have integrity, the second electronic device 550 may determine that the first electronic device 510 has been hacked or the encrypted second data EDATA2 transmitted to the first electronic device 510 has been altered. At this time, the second electronic device 550 may not transmit a key KEY to the first electronic device 510.

Since the first electronic device 510 has not received the key KEY, the encrypted second data EDATA2 may not be decrypted. Further, since the first electronic device 510 may not be able to decrypt the encrypted second data EDATA2, the first program PR may not be generated. Accordingly, the first electronic device 510 may not perform the first function.

Meanwhile, when the hash value HASH does not have integrity, the second processor 560 may transmit notification information for stopping of the operation of the first electronic device 510 to the first electronic device 510 at operation S665.

The first electronic device 510 may provide information indicating hacking or tampering to a user in response to the notification information received from the second electronic device 550. Further, the first electronic device 510 may stop the operation of itself in response to the notification information received from the second electronic device 550 at operation S667.

Figure 7A:
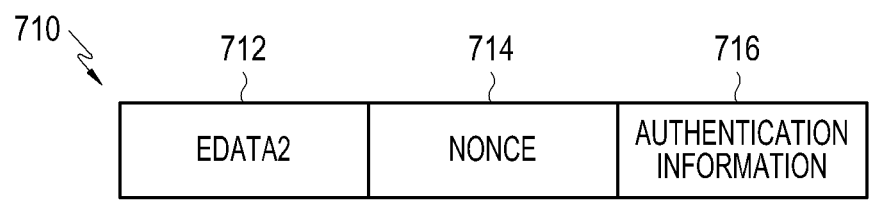
FIGS. 7A and 7B are block diagrams for data transmitted between a first electronic device and a second electronic device according to various embodiments of the present disclosure.
Figure 7B:
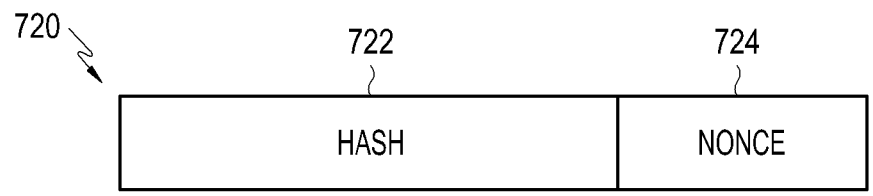

FIGS. 7A and 7B are block diagrams for data transmitted between a first electronic device and a second electronic device according to various embodiments of the present disclosure.

Referring to FIG. 7A, the first electronic device 510 may receive data 710 including encrypted second data EDATA2 712 from the second electronic device 550.

For example, the data 710 may include the encrypted second data 712, nonce 714, and authentication information 716.

The first processor 520 may store the encrypted second data 712 in the first memory 530 or the second memory 535. The first processor 520 may generate a hash value HASH by using the encrypted second data 712 and first data. Further, the first processor 520 may decrypt the encrypted second data 712 by using a key KEY.

The first processor 520 may determine whether the data 710 is transmitted from the second electronic device 550, by using the authentication information 716.

The first processor 520 may transmit the nonce 714 together with the hash value HASH to the second electronic device 550.

Referring to FIG. 7B, the first electronic device 510 may transmit data 720 including a hash value 722 to the second electronic device 550.

For example, the data 720 may include the hash value 722 and a nonce 724.

The first processor 520 may transmit the data 720 including the hash value 722 and the nonce 724 to the second electronic device 550. At this time, the nonce 724 may correspond to the nonce 714 received from the second electronic device 550.

The second processor 560 may receive the data 720 from the first electronic device 510 through the second communication module 580. The second processor 560 may determine whether the hash value 722 and the nonce 724 have integrity. The second processor 560 may determine whether the first electronic device 510 has been hacked on the basis of whether the hash value 722 and the nonce 724 have integrity.

Figure 8:
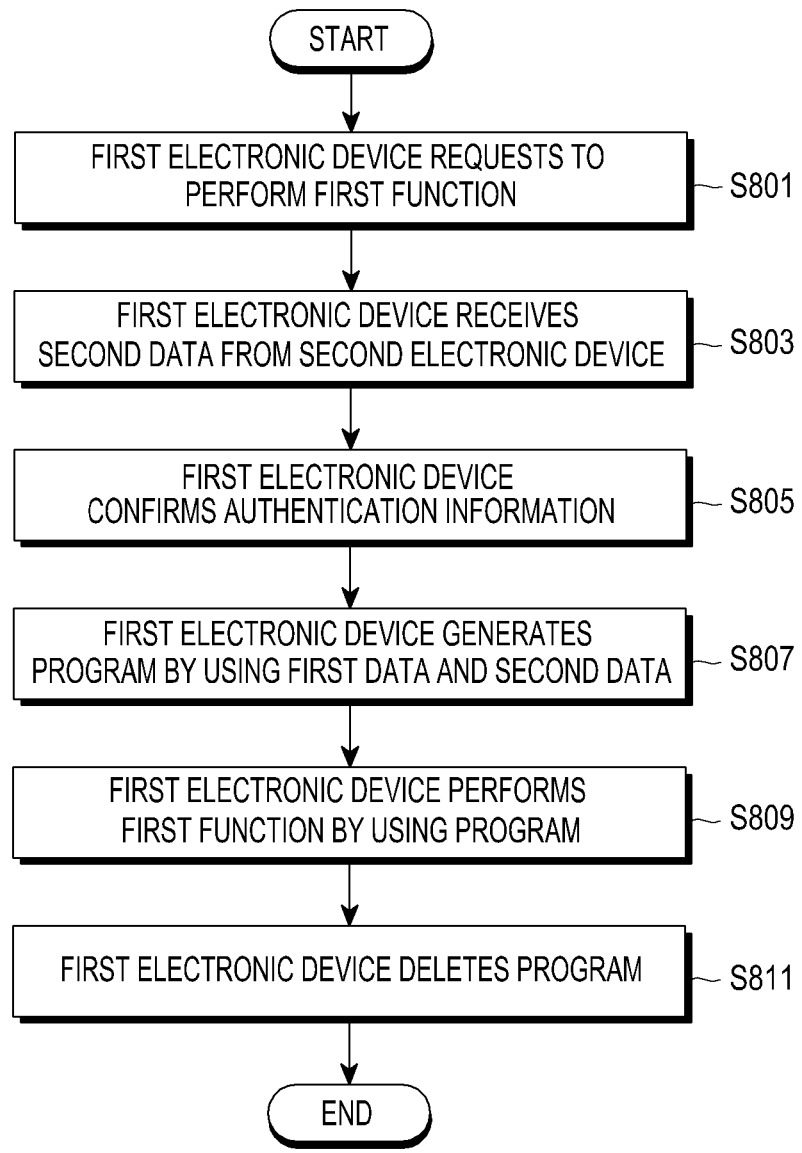
FIG. 8 is a flowchart for explaining an operation of a first electronic device and an operation of a second electronic device according to an embodiment of the present disclosure.

FIG. 8 is a flowchart for explaining an operation of a first electronic device and an operation of a second electronic device according to an embodiment of the present disclosure.

Referring to FIG. 8, the first electronic device 310 may request the second electronic device 350 to perform the first function at operation S801. For example, when the first electronic device 310 receives a request to perform the first function, the first electronic device 310 may request, from the second electronic device 350, a request for the second data DATA2 for the second part of the first program PR for performing the first function.

The second electronic device 350 may transmit the second data DATA2 stored in the memory 370 to the first electronic device 310 in response to the request made by the first electronic device 310.

The first electronic device 310 may receive the second data DATA2 from the second electronic device 350 at operation S803.

The first electronic device 310 may confirm authentication information for the second data DATA2 at operation S805. For example, the first electronic device 310 may confirm the authentication information, and may confirm through the authentication information that the second data DATA2 is data transmitted from the second electronic device 350.

The first electronic device 310 may generate, according to a result of the confirmation, the first program PR by using the first data DATA1 corresponding to the first part and the second data DATA2 corresponding to the second part of the first program PR at operation S807. For example, the first electronic device 310 may generate the first program PR by updating the second data DATA2 to the first data DATA1 stored in the first memory 330.

The first electronic device 310 may perform the first function by using the first program PR at operation S809. For example, the first electronic device 310 may execute the first program PR to perform the first function.

The first electronic device 310 may delete the first program PR after performing the first function at operation S811. Further, the first electronic device 310 may also delete the second data DATA2. For example, the first electronic device 310 may delete the second data DATA2 after generating the first program PR or after performing the first program PR.

Figure 9:
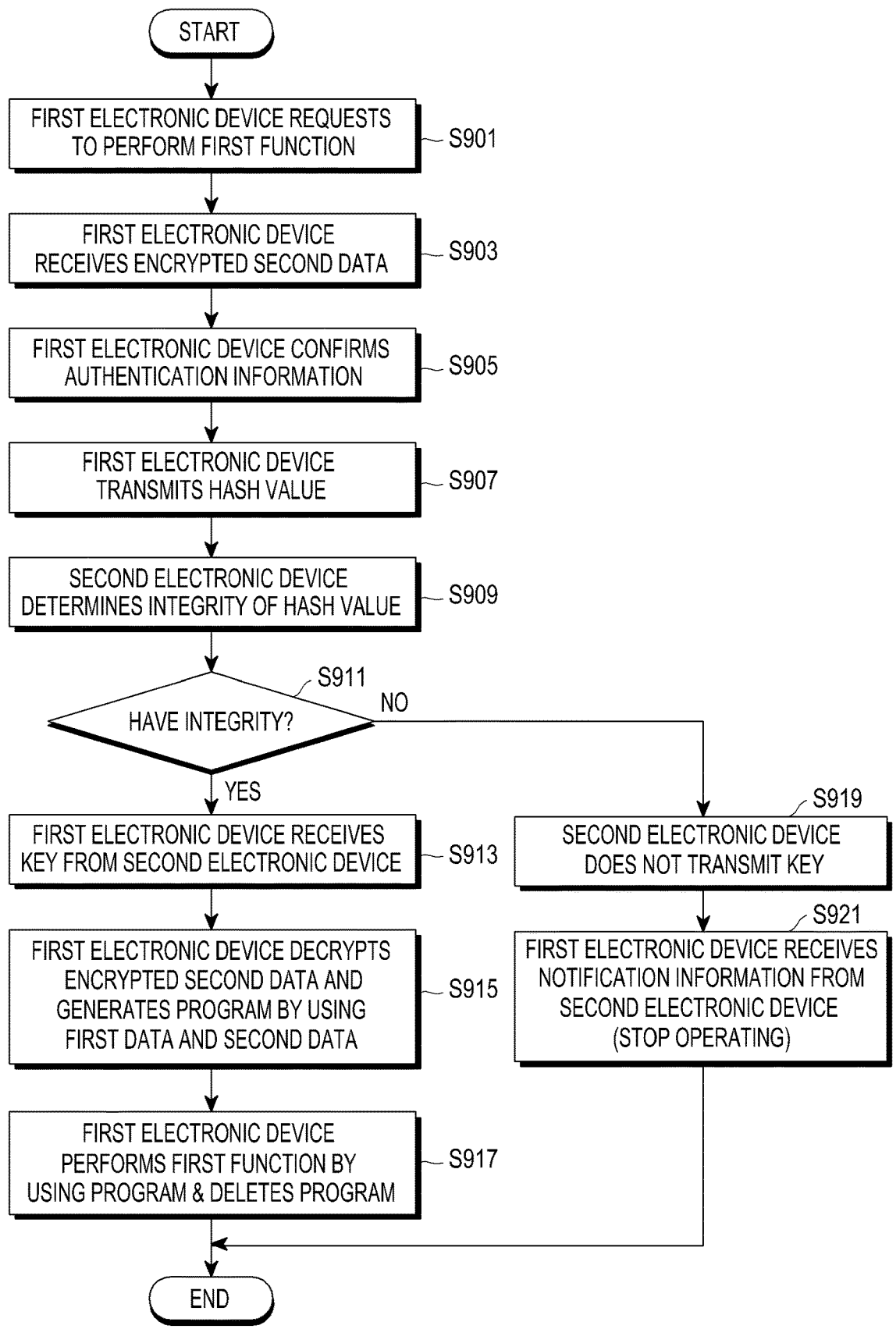
FIG. 9 is a flowchart for explaining an operation of a first electronic device and an operation of a second electronic device according to an embodiment of the present disclosure.

FIG. 9 is a flowchart for explaining an operation of a first electronic device and an operation of a second electronic device according to an embodiment of the present disclosure.

Referring to FIG. 9, the first electronic device 510 may request that the second electronic device 550 perform a first function at operation S901. For example, when the first electronic device 510 receives a request to perform the first function, the first electronic device 510 may request, from the second electronic device 550, encrypted second data EDATA2 for a second part of a first program PR for performing the first function.

The second electronic device 550 may transmit the encrypted second data EDATA2 stored in the memory 570 to the first electronic device 510 in response to the request made by the first electronic device 510. Further, the second electronic device 550 may encrypt second data DATA2 stored in the memory 570 and transmit the encrypted second data EDATA2 to the first electronic device 510.

The first electronic device 510 may receive the encrypted second data EDATA2 from the second electronic device 550 at operation S903.

The first electronic device 510 may confirm authentication information for the encrypted second data EDATA2 at operation S905. For example, the first electronic device 510 may confirm the authentication information, and may confirm through the authentication information that the encrypted second data EDATA2 is data transmitted from the second electronic device 550.

The first electronic device 510 may generate a hash value HASH for the encrypted second data EDATA2 according to a result of the confirmation. For example, when it is confirmed that the encrypted second data EDATA2 is data transmitted from the second electronic device 550, the first electronic device 510 may generate the hash value HASH for the encrypted second data EDATA2.

The first electronic device 510 may transmit the hash value HASH to the second electronic device 550 at operation S907.

The second electronic device 550 may determine whether the hash value HASH has integrity at operation S909. For example, the second electronic device 550 may compare the encrypted second data EDATA2 stored in the memory 570 with the hash value HASH, and may determine whether the hash value HASH has integrity. Further, the second electronic device 550 may compare the second data DATA2 stored in the memory with the hash value HASH, and may determine whether the hash value has integrity according to a result of the comparison.

When the hash value HASH has integrity (YES at operation S911), the second electronic device 550 may transmit a key KEY for enabling decryption of the encrypted second data EDATA2 to the first electronic device 510 at operation S913. Further, the first electronic device 510 may receive the key KEY from the second electronic device 550 at operation S913.

The first electronic device 510 may decrypt the encrypted second data EDATA2 by using the key KEY at operation S915. Further, the first electronic device 510 may generate the first program PR by using the first data DATA1 stored on the first memory 530 and the decrypted second data DATA2 at operation S915.

The first electronic device 510 may perform the first function by using the first program PR at operation S917. Further, the first electronic device 510 may delete the first program PR after performing the first function S917. Meanwhile, the first electronic device 510 may delete the encrypted second data EDATA2 and/or the second data DATA2 after performing the first function.

When the hash value HASH does not have integrity (NO at operation at operation S911), the second electronic device

550 may not transmit the key KEY for enabling decryption of the encrypted second data EDATA2 to the first electronic device 510 at operation S919. For example, since the first electronic device 510 is not able to decrypt the encrypted second data EDATA2, the first function may not be performed.

Meanwhile, the first electronic device 510 may receive notification information for stopping the operation of the first electronic device 510 from the second electronic device 550 at operation S921. For example, the first electronic device 510 may stop the operation of the first electronic device 510 in response to the notification information received from the second electronic device 550 at operation S921.

Figure 10:
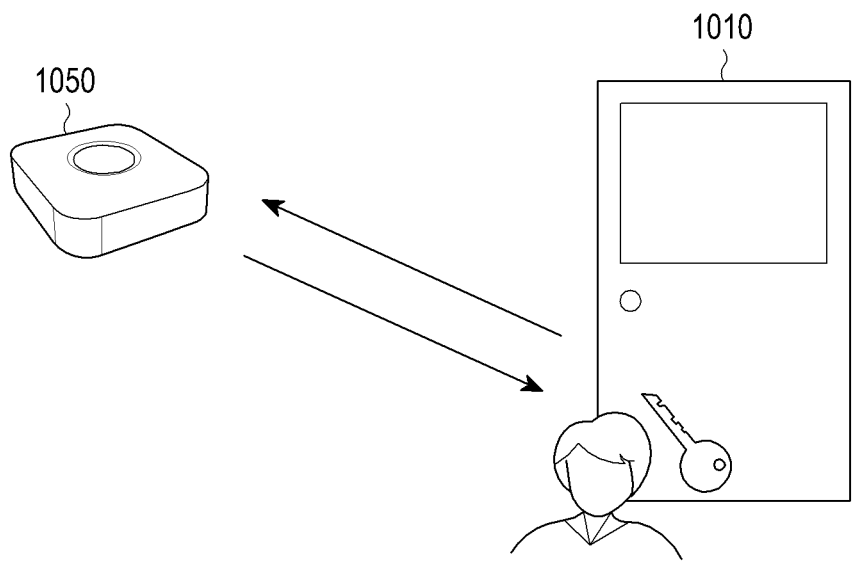
FIG. 10 is a block diagram of an electronic system according to an embodiment of the present disclosure.

FIG. 10 is a block diagram of an electronic system according to an embodiment of the present disclosure.

Referring to FIG. 10, a first electronic device 1010 and a second electronic device 1050 may be implemented substantially the same as or similar to the first electronic device 210 and the second electronic device 250 which are described in FIG. 2.

For example, the first electronic device 1010 may be implemented as a door lock, and the second electronic device 1050 may be implemented as an IoT hub connected with the first electronic device 1010.

The first electronic device 1010 may receive, from a user, a request to perform a first function related to unlocking the door lock.

The first electronic device 1010 may request, from the second electronic device 1050, second data DATA2 or encrypted second data EDATA2 in order to perform the first function. For example, the first electronic device 1010 may request, from the second electronic device 1050, the second data DATA2 or the encrypted second data EDATA2 by using first data DATA1 stored in the first memory of the first electronic device 1010.

According to an embodiment, the first electronic device 1010 may receive the second data DATA2 from the second electronic device 1050. The first electronic device 1010 may generate the first program PR for performing the first function, by using the first data DATA1 stored in the first memory of the first electronic device 1010 and the second data DATA2 received from the second electronic device 1050. Further, the first electronic device 1010 may execute the first program PR to perform the first function related to unlocking of the door lock.

Meanwhile, the first electronic device 1010 may delete the second data DATA2 after performing the first function related to unlocking of the door lock. Further, the first electronic device 1010 may also deleted the first program PR after performing the first function related to unlocking of the door lock.

According to an embodiment, the first electronic device 1010 may receive the encrypted second data EDATA2 from the second electronic device 1050. The first electronic device 1010 may generate a hash value HASH by using the first data DATA1 and the encrypted second data EDATA2, and may transmit the hash value HASH to the second electronic device 1050.

When it is determined by the second electronic device 1050 that the hash value HASH has integrity, the first electronic device 1010 may receive a key KEY for decrypting the encrypted second data EDATA2 from the second electronic device 1050.

The first electronic device 1010 may decrypt the encrypted second data EDATA2 by using the key KEY. The first electronic device 1010 may generate the first program PR for performing the first function by using the first data DATA1 and the decrypted second data DATA2. Further, the first electronic device 1010 may execute the first program PR to perform the first function related to unlocking of the door lock.

The first electronic device 1010 may delete the second data DATA2 after performing the first function related to unlocking of the door lock. Further, the first electronic device 1010 may also delete the first program PR after performing the first function related to unlocking of the door lock.

Meanwhile, when it is not determined by the second electronic device 1050 that the hash value HASH has integrity, the first electronic device 1010 may not receive the key KEY for decrypting the encrypted second data EDATA2 from the second electronic device 1050. Accordingly, the first electronic device 1010 may not perform the first function related to unlocking the door lock.

Figure 11:
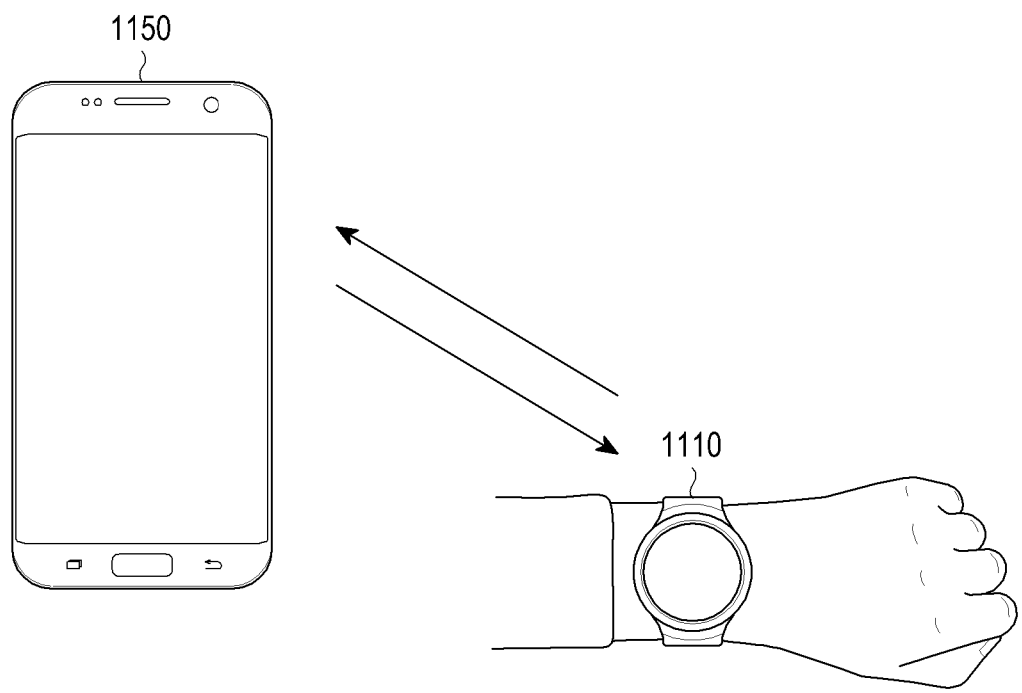
FIG. 11 is a block diagram of an electronic system according to an embodiment of the present disclosure.

FIG. 11 is a block diagram of an electronic system according to an embodiment of the present disclosure.

Referring to FIG. 11, a first electronic device 1110 and a second electronic device 1150 may be implemented substantially the same as or similar to the first electronic device 210 and the second electronic device 250 which are described in FIG. 2.

For example, the first electronic device 1110 may be implemented as a smart watch, and the second electronic device 1150 may be implemented as a smartphone connected with the first electronic device 1110.

The first electronic device 1110 may receive, from a user, a request to perform a first function related to personal information.

The first electronic device 1110 may request, from the second electronic device 1150, second data DATA2 or encrypted second data EDATA2 in order to perform the first function. For example, the first electronic device 1110 may request, from the second electronic device 1150, the second data DATA2 or the encrypted second data EDATA2, by using first data DATA1 stored in a first memory of the first electronic device 1110.

According to an embodiment, the first electronic device 1110 may receive the second data DATA2 from the second electronic device 1150. The first electronic device 1110 may generate a first program PR for performing the first function, by using the first data DATA1 stored in the first memory of the first electronic device 1110 and the second data DATA2 received from the second electronic device 1150. Further, the first electronic device 1110 may execute the first program PR to perform the first function related to personal information.

Meanwhile, the first electronic device 1110 may delete the second data DATA2 after performing the first function related to personal information. Further, the first electronic device 1110 may also delete the first program PR after performing the first function related to personal information.

According to an embodiment, the first electronic device 1110 may receive the encrypted second data EDATA2 from the second electronic device 1150. The first electronic device 1110 may generate a hash value HASH by using the first data DATA1 and the encrypted second data EDATA2, and may transmit the generated hash value HASH to the second electronic device 1150.

When it is determined by the second electronic device 1150 that the hash value HASH has integrity, the first electronic device 1110 may receive a key KEY for decrypting the encrypted second data EDATA2 from the second electronic device 1150.

The first electronic device 1110 may decrypt the encrypted second data EDATA2 by using the key KEY. The first electronic device 1110 may generate the first program PR for performing the first function, by using the first data DATA1 and the decrypted second data DATA2. Further, the first electronic device 1110 may execute the first program PR to perform the first function related to personal information.

The first electronic device 1110 may delete the second data DATA2 after performing the first function related to personal information. Further, the first electronic device 1110 may also delete the first program PR after performing the first function related to personal information.

Meanwhile, when it is not determined by the second electronic device 1150 that the hash value HASH has integrity, the first electronic device 1110 may not receive the key KEY for decrypting the encrypted second data EDATA2 from the second electronic device 1150. Accordingly, the first electronic device 1110 may not perform the first function related to personal information.

A first electronic device according to various embodiments of the present disclosure may include: a communication module, a memory that stores a first part of a first program; and a processor that receives a second part of the first program from a second electronic device through the communication module, and perform a first function of the first program by using the first part and the second part.

The processor may receive an encrypted second part from the second electronic device, transmit a hash value generated using the first part and the encrypted second part to the second electronic device, and decrypt the encrypted second part received from the second electronic device by using a key for decrypting the encrypted second part when the hash value has integrity.

The processor may generate the first program by using the first part and the decrypted second part.

The processor may delete the second part and the first program after performing the first function.

The processor may confirm authentication information included in the encrypted second part and may generate the hash value according to a result of the confirmation.

The processor may request, from the second electronic device, the second part for performing the first function, by using the first part.

The processor may generate the program by updating the second part to the first part.

An operation method of the first electronic device according to various embodiments of the present disclosure may include: requesting a first function of the first electronic device; receiving a second part of a first program for performing the first function from a second electronic device; and performing the first function of the first program by using a first part of the first program, which is stored in the memory of the first electronic device, and the second part.

The performing the first function may include: generating a hash value by using the first part and an encrypted second part received from the second electronic device, and transmitting the generated hash value to the second electronic device; when the hash value has integrity, receiving a key for decrypting the encrypted second part from the second electronic device; and decrypting the encrypted second part by using the key.

The performing the first function may further include generating the first program by using the first part and the decrypted second part.

The performing the first function may further include deleting the second part and the first program after performing the first function.

The generating the hash value may include confirming authentication information included in the encrypted second part and generating the hash value according to a result of the confirmation.

The requesting of the first function may include requesting, from the second electronic device, the second part for performing the first function, by using the first part.

The performing the first function may include generating the program by updating the second part to the first part.

An electronic device according to various embodiments of the present disclosure may include: a communication module, a memory that stores a first part of a first program; and a processor that transmits the first part of the first program through the communication module so that a second electronic device performs a first function of the first program by using the first part and a second part of the first program, which is stored in the second electronic device.

The processor may transmit the encrypted second part to the second electronic device, determine whether a hash value, which is generated based on the first part received from the second electronic device and the encrypted second part, has integrity, and transmit a key for decrypting the encrypted second part to the second electronic device according to a result of the determination.

The processor may transmit the encrypted second part corresponding to the first function to the second electronic device when the second electronic device request, from the first electronic device, the first part for performing the first function.

The processor may compare the hash value received from the second electronic device with the first part stored in the memory, and determine whether the hash value has integrity according to a result of the comparison.

The processor may transmit the key to the second electronic device when the hash value has integrity.

The processor may transmit notification information for stopping the operation of the second electronic device to the second electronic device when the hash value does not have integrity.

Each of the components of the electronic device according to the present disclosure may be implemented by one or more components and the name of the corresponding component may vary depending on the type of the electronic device. In various embodiments, the inspection device may include at least one of the above-described elements. Some of the above-described elements may be omitted from the electronic device, or the inspection device may further include additional elements. Further, some of the components of the electronic device according to the various embodiments of the present disclosure may be combined to form a single entity, and thus, may equivalently perform functions of the corresponding elements prior to the combination.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A first electronic device comprising:
a transceiver;

a memory configured to store first data corresponding to a first part of entire data for obtaining a first program; and a processor configured to:
identify a request to execute a function of the first program,
request second data corresponding to a remaining part for obtaining the first program to a second electronic device,
receive, using the transceiver, the second data which is encrypted and corresponds to the remaining part of the entire data for executing the first program from the second electronic device,
generate a hash value using the first data and the second data,
transmit the hash value to the second electronic device,
receive a key for decrypting the second data from the second electronic device,
decrypt the second data based on the key,
obtain the first program based on the first data and the second data,
perform the function of the first program, and
delete the second data and the first program after performing the function.

2. The first electronic device of claim 1, wherein the processor is further configured to generate the first program based on the first data and the decrypted second data.

3. The first electronic device of claim 1, wherein the processor is further configured to:
identify authentication information included in the second data, and
generate the hash value according to a result of the identification.

4. The first electronic device of claim 1, wherein the processor is further configured to generate the first program by updating the second data to the first data.

5. A method of a first electronic device, the method comprising:
identifying a request to execute a function of a first program, wherein first data corresponding to a first part of entire data for obtaining the first program is stored in the first electronic device;
requesting second data corresponding to a remaining part for obtaining the first program to a second electronic device;
receiving the second data which is encrypted and corresponds to the remaining part of the entire data for executing the first program from the second electronic device;
generating a hash value using the first data and the second data that is encrypted;
transmitting the hash value to the second electronic device;
receiving a key for decrypting the second data from the second electronic device;
decrypting the second data based on the key;
obtaining the first program based on the first data and the second data;
performing the function of the first program; and
deleting the second data and the first program after performing the function.

6. The method of claim 5, wherein the obtaining of the first program comprises generating the first program using the first data and the decrypted second data.

7. The method of claim 5, wherein the generating of the hash value comprises:
identifying authentication information included in the second data; and
generating the hash value according to a result of the identification.

8. The method of claim 5, wherein obtaining the first program comprises generating the first program by updating the second data to the first data.

* * * * *